(12) United States Patent
Sakota et al.

(10) Patent No.: US 6,945,384 B2
(45) Date of Patent: Sep. 20, 2005

(54) PARTS ALIGNER

(75) Inventors: Kouji Sakota, Hiroshima (JP); Masaaki Miura, Hiroshima (JP); Seiji Miura, Hiroshima (JP)

(73) Assignee: Seki Kogyo Co., Ltd., Hiroshima (JP)

( * ) Notice: Subject to any disclaimer, the term of this patent is extended or adjusted under 35 U.S.C. 154(b) by 1 day.

(21) Appl. No.: 10/876,669

(22) Filed: Jun. 28, 2004

(65) Prior Publication Data

US 2005/0092584 A1 May 5, 2005

(30) Foreign Application Priority Data

Oct. 30, 2003 (JP) ....................................... 2003-371119

(51) Int. Cl.$^7$ ............................................... B65G 15/58
(52) U.S. Cl. .................................................. 198/690.1
(58) Field of Search ........................... 198/690.1, 619, 198/381, 396, 443, 377.05, 377.09

(56) References Cited

U.S. PATENT DOCUMENTS

| | | | | |
|---|---|---|---|---|
| 2,862,601 A | * | 12/1958 | Littwin et al. ........... | 198/472.1 |
| 2,863,588 A | * | 12/1958 | Stover ......................... | 198/443 |
| 3,430,752 A | * | 3/1969 | Spodig ........................ | 198/443 |
| 3,754,313 A | * | 8/1973 | McCulloch .................. | 198/381 |
| 5,913,402 A | * | 6/1999 | Miura et al. ............. | 198/690.1 |
| 6,123,184 A | * | 9/2000 | Yasuda et al. .............. | 198/381 |
| 6,334,523 B1 | * | 1/2002 | Fukunaga ................. | 198/345.3 |
| 6,443,291 B2 | * | 9/2002 | Rivers, Jr. ................... | 198/392 |
| 6,782,992 B2 | * | 8/2004 | Mimura et al. .............. | 198/443 |

FOREIGN PATENT DOCUMENTS

JP 3117662 2/1999

* cited by examiner

*Primary Examiner*—Richard Ridley
(74) *Attorney, Agent, or Firm*—Donald R. Studebaker; Nixon Peabody, LLP

(57) ABSTRACT

A parts aligner is provided with an attraction means 8 orbitally movable in a specific orbit R, and also provided with a posture shift guide 11, a regulating piece 12 and a thickness sorting guide 13 along a specific circumference P corresponding to the specific orbit R in the order of the direction of orbital movement of the attraction means 8. With this structure, only regular parts shifted into a specific posture are guided to an alignment and feed guide 14 and irregular parts are stored in an irregular parts storing part 16.

5 Claims, 22 Drawing Sheets

PRIOR ART

PRIOR ART $T_b < L \leqq h < T$ $T_b < L \leqq h < T$ $T_c > T$

PARTS ALIGNER

BACKGROUND OF THE INVENTION (1) Field of the Invention

The present invention relates to a parts aligner for use in aligning a large number of randomly stored parts each in a unified posture and is suitable, in particular, in automatically feeding welding nuts as parts to automatic welding equipment with each in a prescribed posture.

(2) Description of Related Art

Conventionally, as a parts aligner of this kind, there has been known one in which vibration-rotation is applied to a bowl stored with parts to give a centrifugal force to the parts in the bowl, so that the parts move upward on a spiral slope located on the inner periphery of the bowl and undergo automatic posture shift, sorting by size and sorting by orientation (top or bottom) in the course of their upward movement.

Another parts aligner of this kind is disclosed in Japanese Patent Number 3117662. This part aligner comprises a face plate, a plurality of attraction means that are disposed to either one side (i.e., the front or back) of the face plate and move orbitally, and a posture shift guide and a top-bottom sorting means both disposed on the other side (the back or front) of the face plate. In this parts aligner, a part is attracted to the other side of the face plate by: the attraction means, and the attracted part is moved to the posture shift guide by an orbital movement of the attraction means so as to be shifted into a prescribed posture. Then, the part is moved to the top-bottom sorting means by a further orbital movement of the attraction means. This top-bottom sorting means removes a part whose top and bottom are not in a prescribed orientation by utilizing its difference in projection height from the face plate depending on the orientation of the top and bottom of the part. Thus, the parts aligner successively aligns parts as unified in the prescribed posture with the top and bottom of each put in the prescribed orientation.

The above parts aligner can align parts with each in the same orientation as long as the parts are of regular shape. However, for example, irregular parts that are totally thinner than the regular parts will pass through the top-bottom sorting means independently of whether the part face opposed to the face plate is the bottom or the top. The reason for this is that the top-bottom sorting means identifies the orientation of each part (i.e., whether the part is face-up or face-down) based on the projection height of a specific section (middle section) of each part from the face plate. Thus, irregular parts are often improperly mixed into regular parts.

SUMMARY OF THE INVENTION

The present invention is made in view of the above problem, and its object is to reject irregular parts while sorting regular parts depending on whether each is face-up or face-down to align them in a unified posture.

More particularly, according to the present invention, a parts aligner for sorting parts depending on whether each is face-up or face-down and thereby shifting the parts into a unified posture comprises:

a face plate;

attraction means placed on either one side of said face plate, said attraction means being configured to attract the parts on the other side of the face plate through the face plate and orbitally move in a specific orbit;

a posture shift guide for shifting a part attracted by the attraction means and moving on a specific circumference corresponding to the specific orbit into a posture in which the top face or bottom face of the part is directed to the other side of the face plate;

a top-bottom sorting means for permitting the passage of, out of parts shifted in posture and attracted and moved by the attraction means, parts each with its top face directed to the other side of said face plate, while rejecting the passage of parts each with its bottom face directed to the other side of said face plate; and a regular parts sorting means for guiding, out of parts passing through said top-bottom sorting means and attracted and moved by the attraction means, parts of regular shape (hereinafter, referred to as regular parts) to a first path, while guiding parts of irregular shape (hereinafter, referred to as irregular parts) to a second path different from the first path.

In the above-described parts aligner, the parts attracted by the attraction means move on the specific circumference. The posture shift guide, the top-bottom sorting means and the regular parts sorting means are disposed on the specific circumference in the order of the direction of orbital movement of the attraction means. Therefore, the parts are first shifted into a specific posture by passing through the posture shift guide. Next, the parts shifted into the specific posture are sorted based on the orientation of the top face or bottom face by the top-bottom sorting means. Then, while the parts whose top faces are directed to the other side of the face plate are permitted to pass through the top-bottom sorting means, the parts whose bottom faces are directed to the other side of the face plate are rejected by the top-bottom sorting means. Furthermore, after passing through the top-bottom sorting means, the regular parts are guided to the first path and the irregular parts to the second path, by the regular parts sorting means. Thereafter, the regular parts guided to the first path are automatically fed to automatic welding equipment or the like or, in order to do this, stored in a parts alignment and storage tube or the like.

Therefore, even if the regular parts and the irregular parts are both fed to the parts aligner and then the irregular parts pass through the top-bottom sorting means, the irregular parts can be separated from the regular parts after their passage and all of a large number of regular parts can be successively aligned into a unified posture.

In the preferred embodiment, the face plate may be fixed in position, and the attraction means may be moved orbitally on one side of the face plate to move the parts on the other side of the face plate.

The attraction means may be fixed with respect to one side of the face plate, and the face plate may be rotated. Thus, the attraction means may be relatively orbitally moved. In this case, the parts attracted by the attraction means move orbitally together with the rotation of the face plate.

In the preferred embodiment, the face plate is flat. Furthermore, the face plate may be formed in a drum and the attraction means may be provided to the external side or the internal side of the drum, whereby the parts may move on the outer periphery or the inner periphery of the drum.

In the preferred embodiment, said face plate may be flat and disposed in a tilted position with the other side thereof facing diagonally upward, said top-bottom sorting means and said regular parts sorting means may be disposed in an upper position of the other side of said face plate, said parts aligner may further comprise a parts reservoir capable of storing a plurality of parts in their nonaligned positions, said parts reservoir being disposed in the vicinity of the lower end of the other side of said face plate, and said attraction means may be configured to attract the parts in said parts-storing part and move the attracted parts.

Therefore, when the parts to be aligned are fed to the parts-storing part, the attraction means attract the parts in the parts-storing part and the attracted parts move on the specific circumference with the orbital movement of the attraction means. The parts are shifted each into a specific posture by the posture shift guide. In this case, when the parts are not completely shifted into this specific posture, they are rejected and dropped by the posture shift guide. Thereafter, the parts are sorted by the top-bottom sorting means depending on the orientation, i.e., whether each is face-up or face-down. At this time, when the parts are directed oppositely to a prescribed orientation, the parts are rejected and dropped by the top-bottom sorting means. Since the face plate is disposed in a tilted position, the parts rejected and dropped by the posture shift guide and the like are caused to slide down on the face plate by the action of gravity to automatically return to the parts reservoir. Thereafter, the parts passing through the top-bottom sorting means reach the regular parts sorting means, in which out of these parts, regular parts are guided to the first path while irregular parts are guided to the second path.

In the preferred embodiment, the parts aligner may further comprise: an alignment and storage part for storing parts of regular shape guided to said first path in an aligned position; and an irregular parts storing means for storing parts of irregular shape guided to said second path.

Therefore, even when both the regular parts and the irregular parts are fed to the parts aligner (parts-storing part), a repetition of orbital movement of the attraction means automatically allow the regular parts to be fed to the first path in their prescribed posture and with their top faces and bottom faces unified each into a prescribed orientation while automatically allowing the irregular parts to be stored in the irregular parts storage part through the second path.

In the preferred embodiment, said parts may be welding nuts each comprising: a nut body of a prescribed thickness having its top face and bottom face in parallel with each other and both in the form of substantially square; and projections extending from the respective corners of said nut body on the bottom face, said top-bottom sorting means may be composed of a regulating piece having a narrower width than the distance between the adjacent projections of the welding nut, and said regulating piece may be positioned generally in the middle of a path through which the welding nut is attracted and moved by said attraction means and may be disposed to form, between the regulating piece and the face plate, a space which is larger than the thickness of said nut body and smaller than the overall thickness of the welding nut including said nut body and said projections.

Therefore, the welding nut attracted by the attraction means in a posture with the top face opposed to the other side of the face plate makes the projection height from the face plate in its section between the adjacent projections (in its section corresponding to the position of the regulating piece) smaller than that at the projections, i.e., equivalent to the thickness of the nut body. Thus, the welding nut passes through the space between the regulating piece and the face plate without interfering with the regulating piece. On the other hand, the welding nut attracted by the attraction means in a posture with the bottom face opposed to the other side of the face plate makes the projections abut against the face plate. In this case, the projection height of the welding nut from the face plate is equivalent to the overall thickness of the welding nut including the projections even in its section corresponding to the regulating piece. Hence, the welding nut interferes with the regulating piece and is thereby rejected. In this way, only welding nuts whose top faces are directed to the other side of the face plate are delivered while being attracted by the attraction means.

However, if the top-bottom sorting means is composed of the regulating piece, a welding nut totally thinner than the distance between the regulating piece and the face plate passes through the top-bottom sorting means independently of whether its face directed to the other side of the face plate is the top face or the bottom face.

In a preferred embodiment, said first path may be placed outside the specific circumference, while said second path may extend along said specific circumference, and said regular parts sorting means may sort the parts into those of regular shape and those of irregular shape on the basis of the maximum thickness, release the parts of regular shape from the attraction of said attraction means to guide them to the first path, and permit the parts of irregular shape to move to the second path while being attracted by said attraction means.

For example, as the regular parts sorting means, a guide is provided on the specific circumference so as to be opposed to the face plate with a space of a predetermined size left therebetween and to engage with each regular part whose maximum thickness is larger than the predetermined size. The guide engages with each regular part, and causes the regular part to depart from the specific circumference to guide to the first path. The irregular parts each having a maximum thickness smaller than the predetermined size move through the space while being attracted by the attraction means and following the specific circumference, without engaging with the guide, and then move to the second path. The welding nut guided to the second path is separated from the attraction of the attraction means, and then stored in the irregular parts storage part.

In this case, the lower limit of the overall thickness of the welding nut sorted as a regular welding nut can be determined by changing the size of the space between the guide and the face plate.

DETAILED DESCRIPTION OF THE INVENTION

Figure 1:
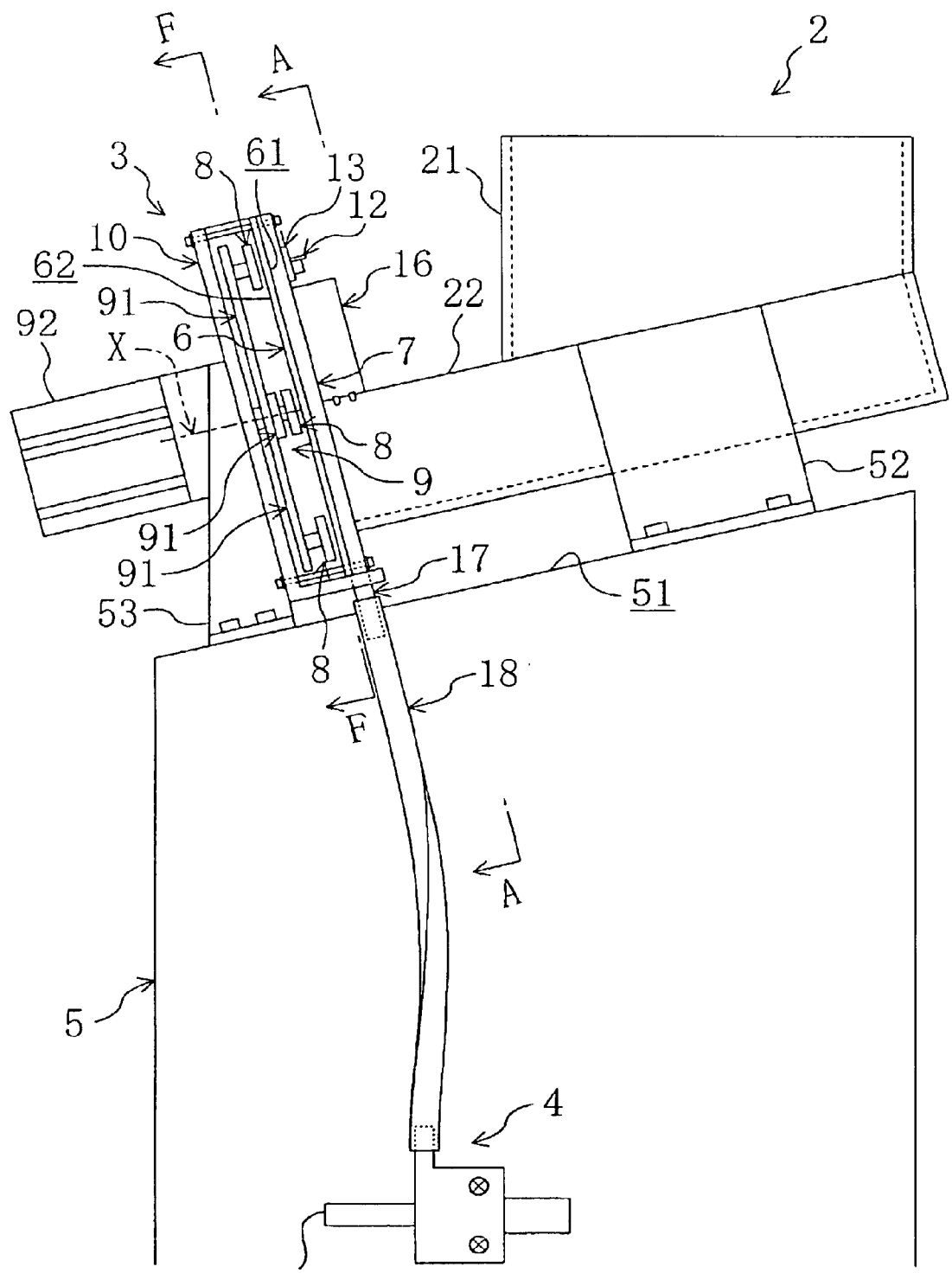
FIG. 1 is a front view of a parts aligner.
Figure 2:
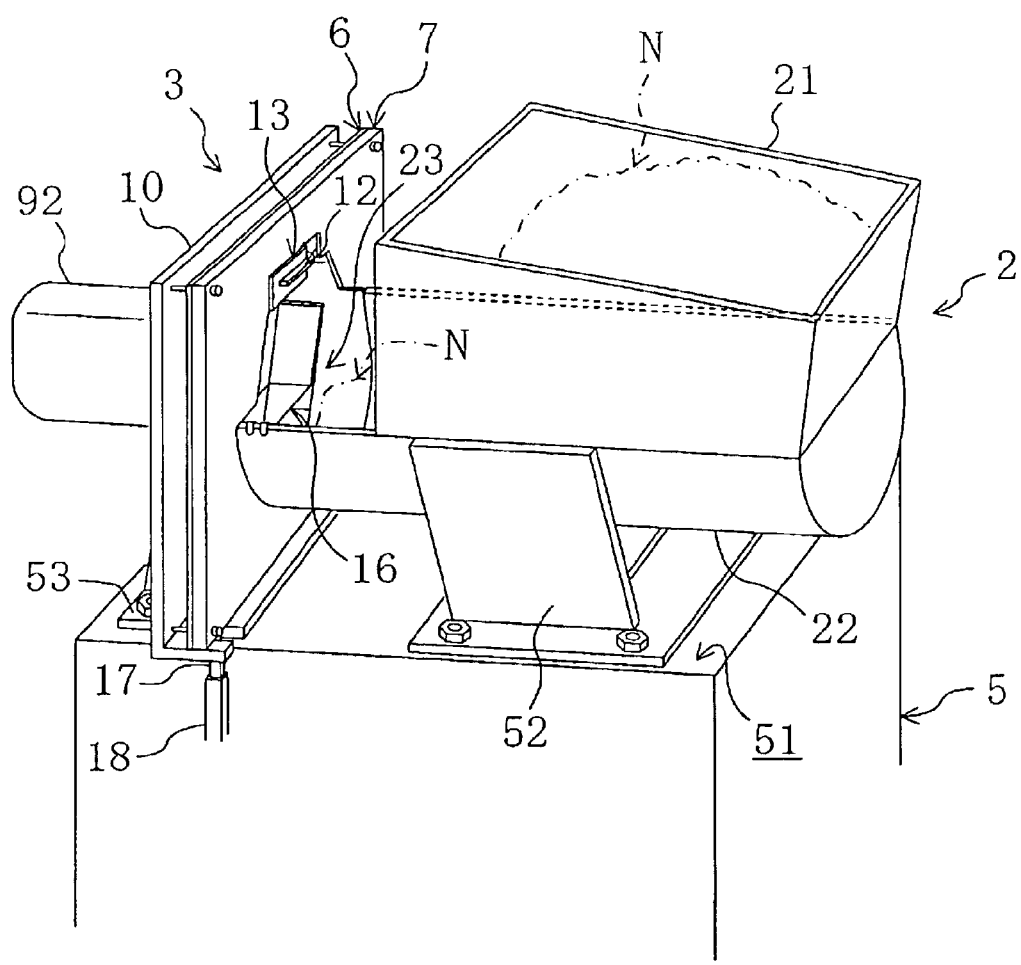
FIG. 2 is a perspective view of the parts aligner.

An embodiment of the present invention will be described hereinafter in detail with reference to the drawings. FIGS. 1 and 2 illustrate a parts aligner in which parts to be aligned are welding nuts N. In these drawings, the reference numeral 2 denotes a charging chute into which a large number of welding nuts N are charged randomly, and the reference numeral 3 denotes a main unit of the nut aligner in which the welding nuts N in the charging chute 2 are aligned. The reference numeral 4 denotes a feeder for feeding welding nuts N aligned in the main body 3 one by one to unshown nut welding equipment, for example, by compressed air. These components are mounted on a base 5.

Figure 3:
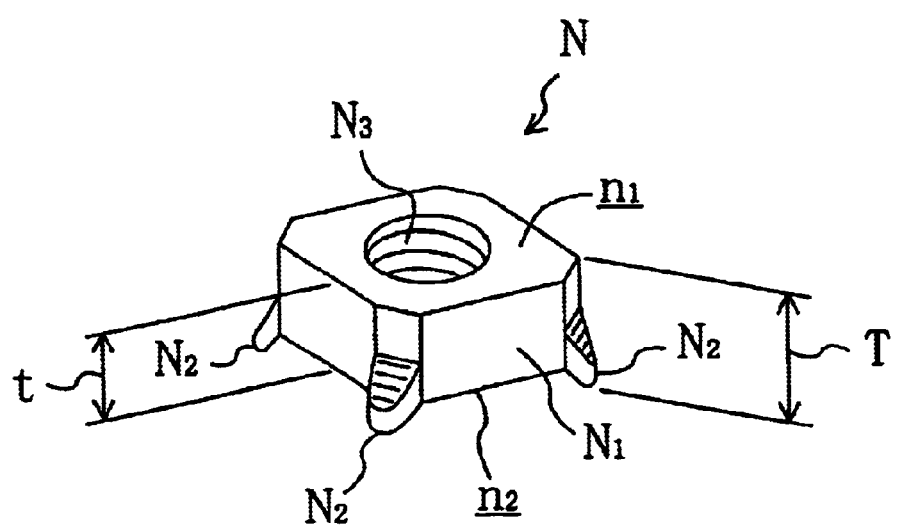
FIG. 3 is a perspective view of a welding nut.

A description will be now given of the above welding nut N with reference to FIG. 3. The welding nut N has a nut body $N_1$ of a prescribed thickness t whose parallel top face $n_1$ and bottom face $n_2$ are formed in substantially square as viewed from the top thereof. The nut body $N_1$ is integrally formed with projections $N_2$ extending from four corners of the nut body $N_1$ on the bottom face $n_2$ side, respectively. Accordingly, the overall thickness T of the welding nut N equals to the sum of the thickness t of the nut body $N_1$ and the projection height of projections $N_2$. In the same drawing, $N_3$ represents a tapped hole penetrating from top to bottom face.

Turning back to FIGS. 1 and 2, each component of the parts aligner will be described in detail. The charging chute 2 includes a hopper tube portion 21 open at both the top and bottom, and a trough-like chute portion 22 having a substantially half-round cross section with the upper face open. The proximal end of the chute portion 22 communicates with the opening at the bottom of the hopper tube portion 21, while the distal end thereof is located diagonally downward from the proximal end. The charging chute 2 is fixed by a bracket 52 to the base 5, whose top face is an inclined surface 51, on a higher position of the inclined surface 51.

The main body 3 includes a rectangular face plate 6, a rectangular guide plate 7, a plurality of attraction means 8, a drive means 9, and a support plate 10. The face plate 6 is placed orthogonally to the direction in which the trough-like chute portion 22 is inclined. The guide plate 7 has substantially the same contour as the face plate 6. Each attraction means 8 is disposed to a back face 62 which is either one side (i.e., the front or back of the face plate 6, and produces a magnetic field on a front face 61 which is the other side (i.e., the back or front) of the face plate 6. The drive means 9 causes the orbital movement of each attraction means 8 about the central axis X. The support plate 10 has the same rectangular shape as the face plate 6 and is L-shaped in cross section. The main body 3 is fixed on a lower position of the inclined surface 51 of the base 5 by a bracket 53.

The face plate 6 is placed in a tilted position so that the front face 61 faces diagonally upward toward the charging chute 2. The guide plate 7 is overlaid on the front face 61 side of the face plate 6, and these plates are integrated with each other by unshown screws. The face plate 6 is fixed to the support plate 10 by bolts and nuts with the attraction means 8 interposed therebetween and with a distance sufficient to hold the attraction means 8 against contact with the back face 62 of the face plate 6 maintained therebetween. The face plate 6, the guide plate 7 and the support plate 10 are preferably formed from non-magnetic or feeble magnetic materials such as synthetic resin so as not to impede the orbital movement of each at&action means 8. In addition, since the welding nut N will slide on the front face 61, the face plate 6 is preferably formed from non-magnetic, excellent abrasion-resistant materials such as stainless steel.

Figure 4:
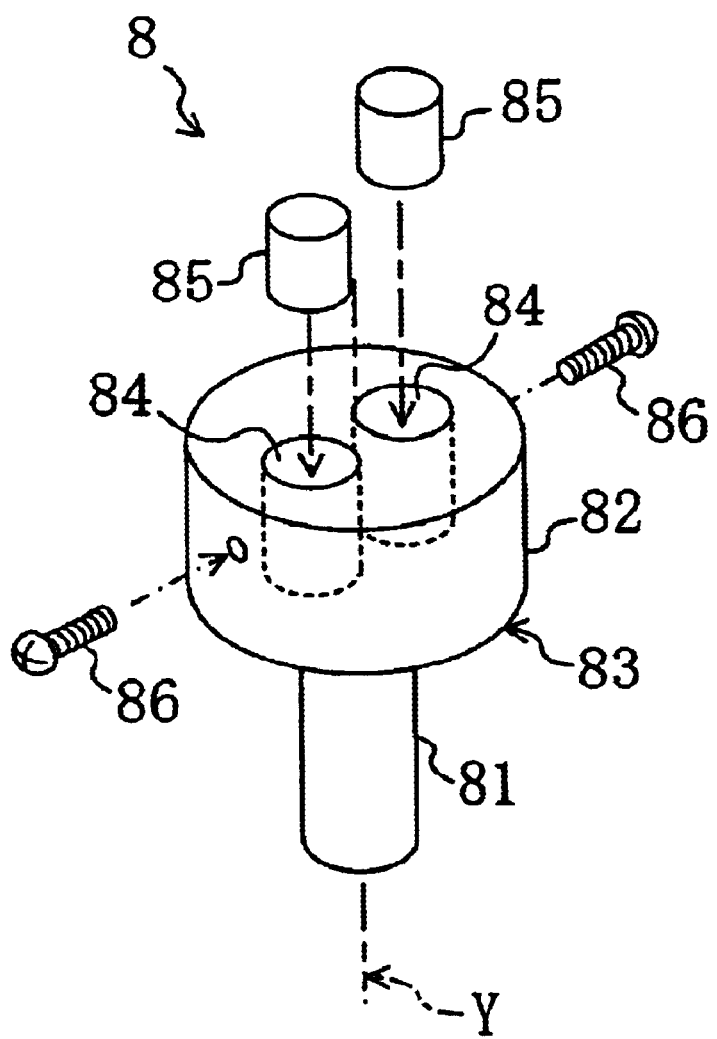
FIG. 4 is an exploded perspective view on an enlarged scale of an attraction means.

As shown in detail in FIG. 4, the attraction means 8 each includes: a rotary head 83 in which a large-diameter head 82 is integrally formed at the end of a shaft 81; a pair of bottomed holes 84 opening at the top face of the head 82 of the rotary head 83; a pair of permanent magnets 85 fitted inside the respective bottomed holes; and screws 86 penetrating from the periphery of the head 82 to the respective bottomed holes 84 to tighten and clamp the respective permanent magnets 85. Both the permanent magnets 85 are fitted inside the respective bottomed holes 84 to produce magnetic fields opposite to each other, and positioned so as to be opposed to each other to interpose therebetween the axis Y passing through the center of the rotary head 83.

Figure 5:
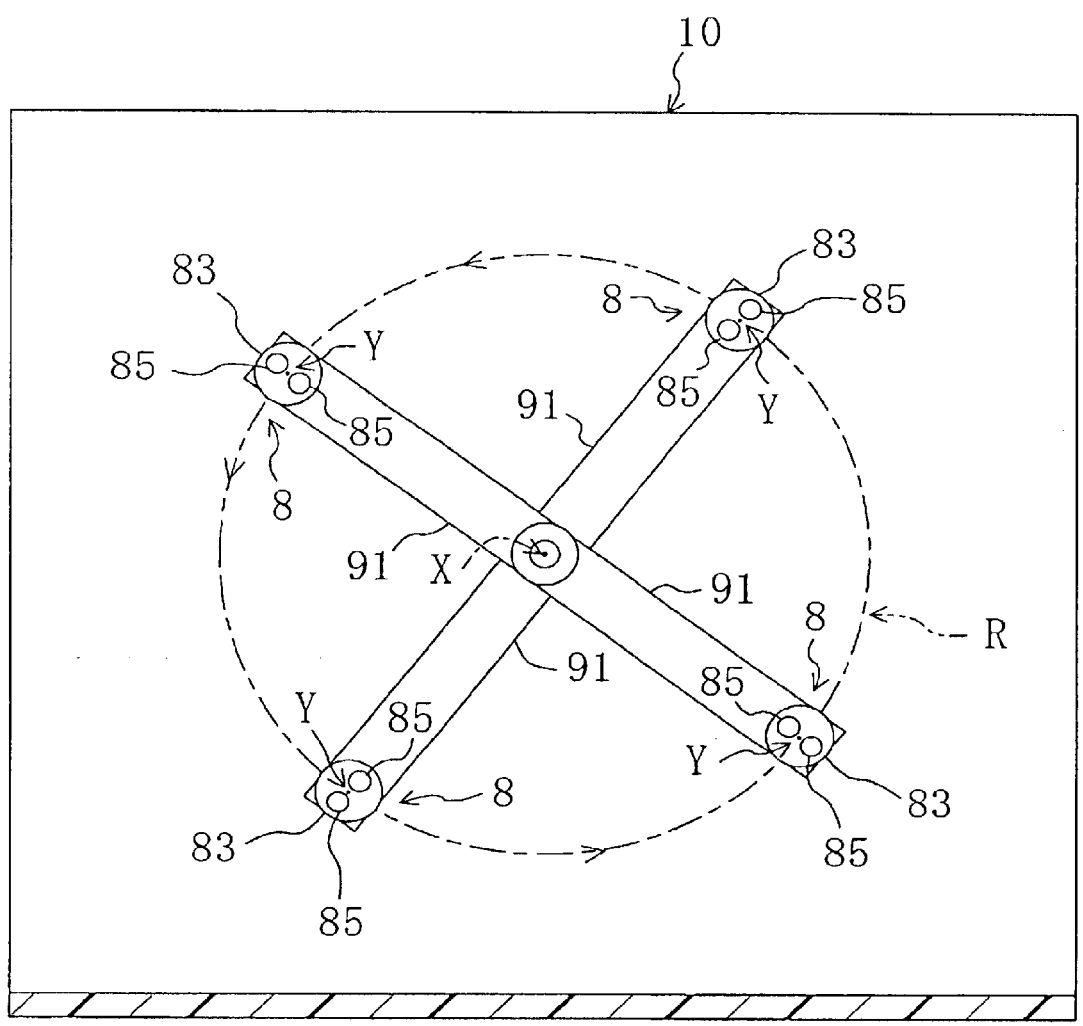
FIG. 5 is an illustrative cross-sectional view taken along line F—F in FIG. 1.
Figure 6:
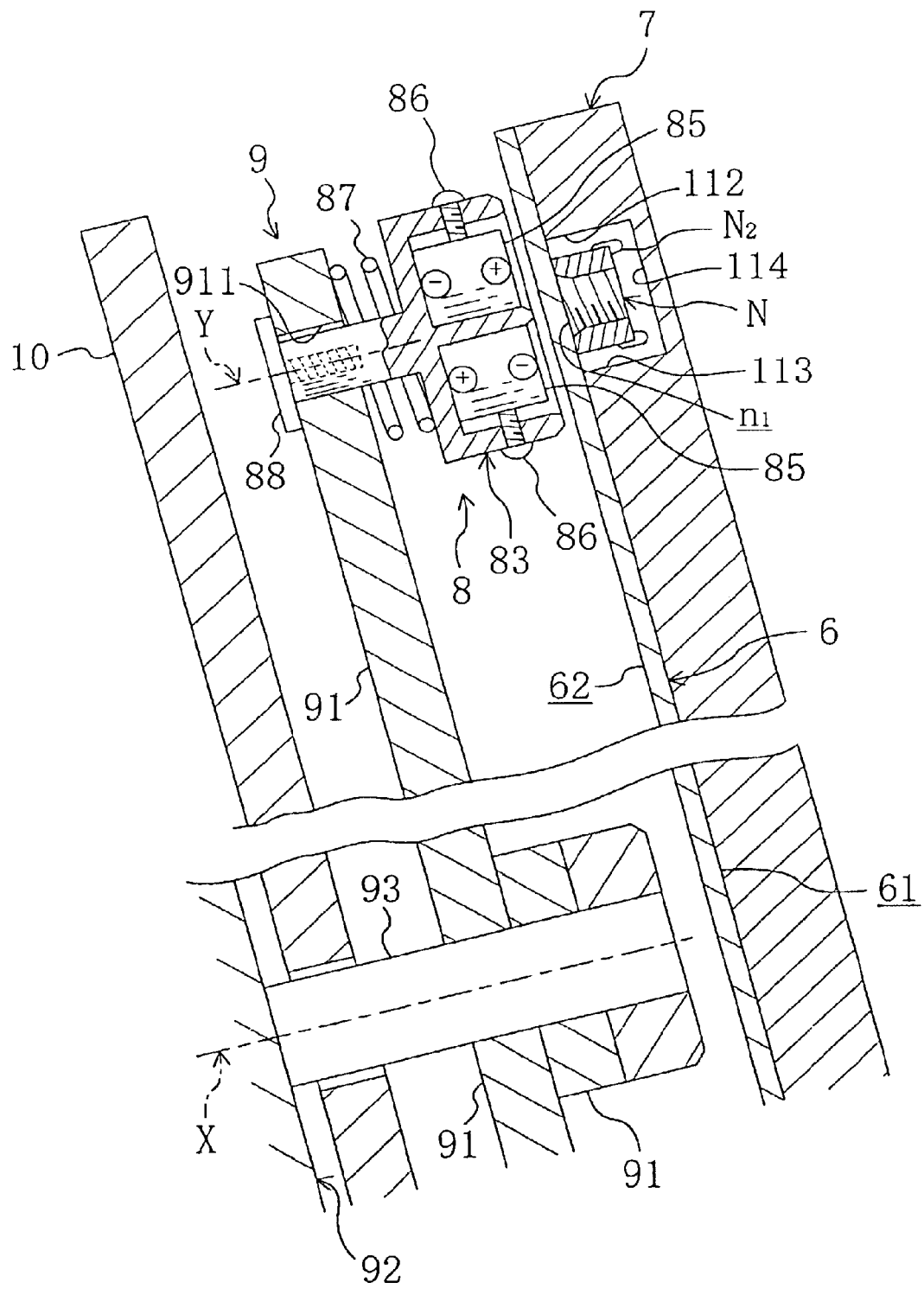
FIG. 6 is an illustrative cross-sectional view taken along line C—C in FIG. 12.

The drive means 9 includes four arms 91 assembled crosswise with respect to the central axis X as shown in FIG. 5, and a motor 92 (see FIG. 1). As shown in FIG. 6, the proximal ends of the arms 91 are fixed to the rotary output shaft 93 of the motor 92. The shaft 81 of each attraction means 8 is inserted into a mounting hole 911 at the distal end of the corresponding arm 91 with a coil spring 87 disposed thereon so that an axis Y is parallel to the central axis X, and fastened by a fixing screw 88. Thus, the attraction means 8 are disposed so that their axes Y move in a specific orbit R (see FIG. 5) in a state where each pair of permanent magnets 85 are urged so as to be opposed to the back face 62 of the face plate 6 with a little clearance therebetween. When there occurs some distortion or warpage in the face plate 6, the rotary head 83 may contact the face plate 6. In such a case, however, the coiled spring 87 exerts a buffering effect by shrinking.

The guide plate 7 will be described in detail with reference to FIGS. 7 and 8. The guide plate 7 is thicker than the overall thickness T of the welding nut N, and the back face 72 thereof opposed to the face plate 6 is formed with grooves 111 and 141 that are concave from the plate face. The grooves 111, 141 constitute a posture shift guide 11 and an alignment and feed guide 14 (see FIG. 7), respectively, through the overlaying of the guide plate 7 on the face plate 6.

The guide plate 7 has an opening 73 of a prescribed shape passing through the full thickness of the plate around its center. The opening 73 is provided with the chute portion 22, a regulating piece 12 as a top-bottom sorting means, and a thickness sorting guide 13 as a regular parts sorting means. The lower half of the opening 73 is named a lower opening 731, which has a semicircular shape corresponding to the cross sectional shape of the chute 22. The groove 111 is formed along a circumference P having the same radius as the above specific orbit R about the central axis X (hereinafter, referred to as a specific circumference P) to begin with an inlet end located at the left end of the opening edge of the lower opening 731 (the left end in FIG. 8) and reach the vicinity of the uppermost of the circumference P. A portion of the groove 111 toward its inlet end is formed to increase its width toward its inlet end. The groove 141 is formed to tangentially extend from the vicinity of the uppermost part of the specific circumference P, curve perpendicularly downward, and then extend to the lower-end side of the guide plate 7 outside the specific circumference P.

The groove 111 is composed of an outer side wall 112, an inner side wall 113 and a bottom wall 114. The groove 141 is composed of an outer side wall 142, an inner side wall 143 and a bottom wall 144. The groove depth between the back face 72 of the guide plate 7 and each bottom wall 114, 144 is set to a dimension corresponding to the overall thickness T of the welding nut N. The internal distance between each outer side wall 112, 142 and each inner side wall 113, 143 is set to a dimension corresponding to the length of one side of the welding nut N. The upper half of the opening 73 is named an upper opening 732, which has a substantially rectangular shape. The grooves 111 and 141 are partly discontinuous at the upper end of the upper opening 732. More particularly, the outer side walls 112 and 142 are continuous with each other through an outer side wall 136. A part of the upper portion of the bottom wall 114 and a part of the upper portion of the bottom wall 144 are continuous with each other through a bottom wall 137. The inner side walls 113 and 143 are discontinuous from each other.

The distal end of the chute 22 is attached to the opening edge of the lower opening 731 with the face plate 6 overlaid on the guide plate 7. Thus, a nut reservoir 23 for storing welding nuts N is formed in the space surrounded by the lower half of the front face 61 and the chute 22. As also shown in FIG. 7, on the specific circumference P in the upper half of the face plate 6, the posture shift guide 11, the regulating piece 12, the thickness sorting guide 13, and the parts removing part 15 and an irregular parts storage part 16 each as an irregular parts storage means are disposed sequentially in the direction of orbital movement of the attraction means 8 (counterclockwise of FIG. 7). Furthermore, the thickness sorting guide 13 extends tangentially from the specific circumference P, and the alignment and feed guide 14 is placed on the rear side of the outlet of the thickness sorting guide 13.

Figure 7:
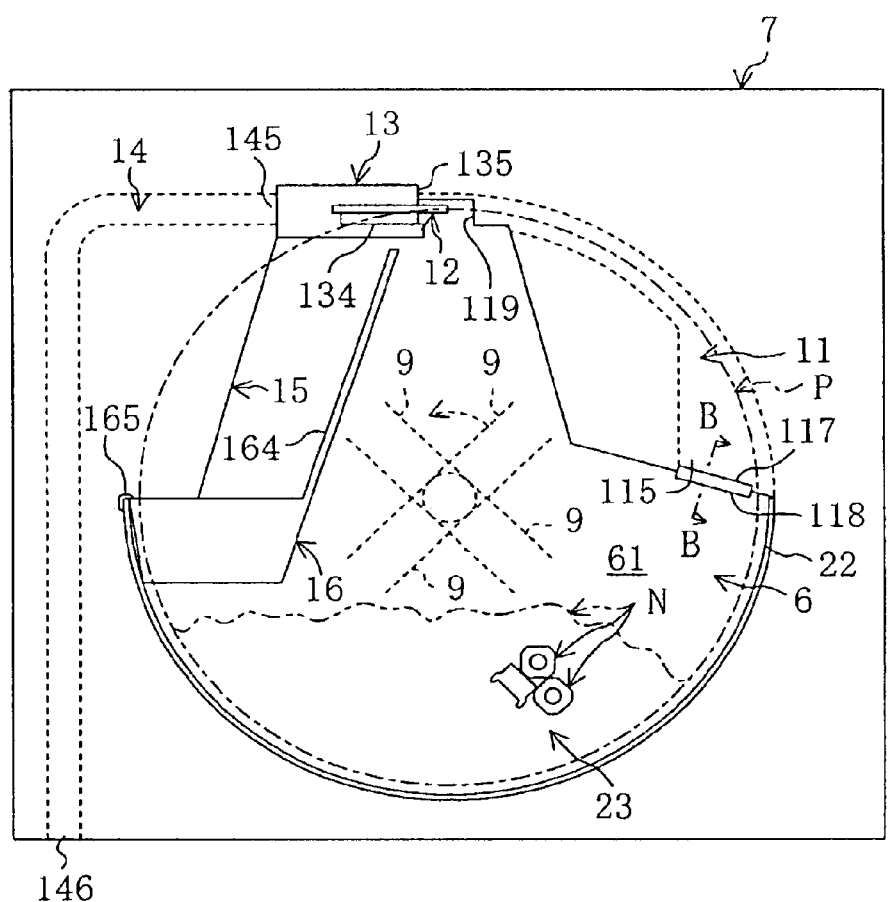
FIG. 7 is an illustrative cross-sectional view taken along line A—A in FIG. 1.
Figure 8:
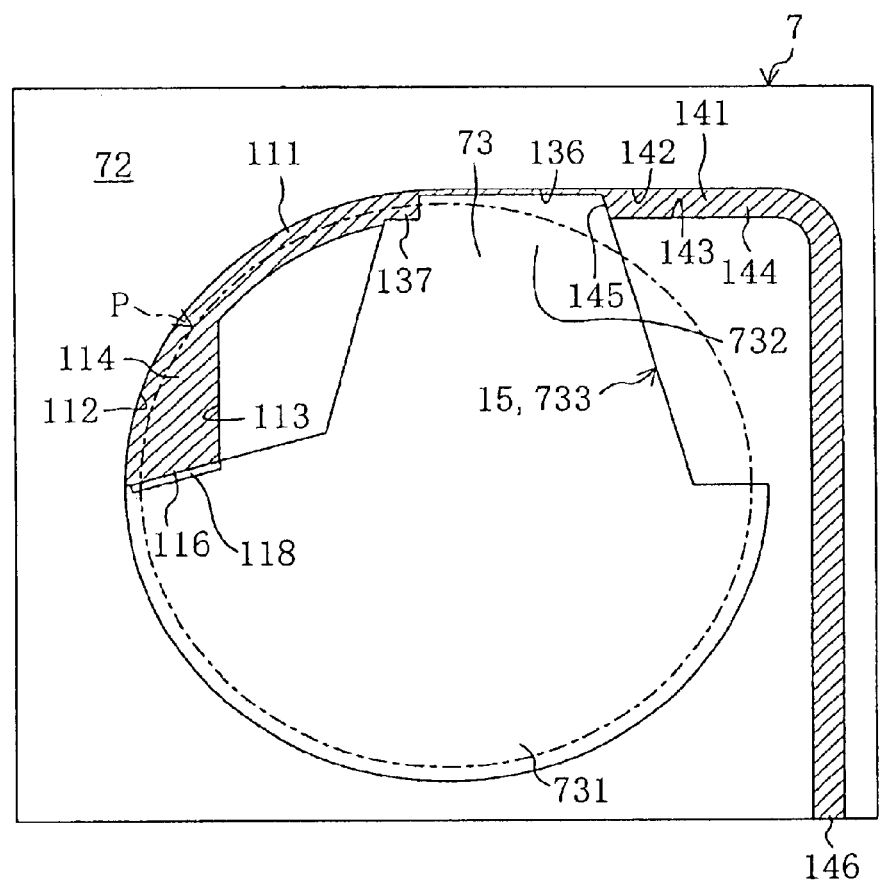
FIG. 8 is a back view of a guide plate 7.
Figure 9:
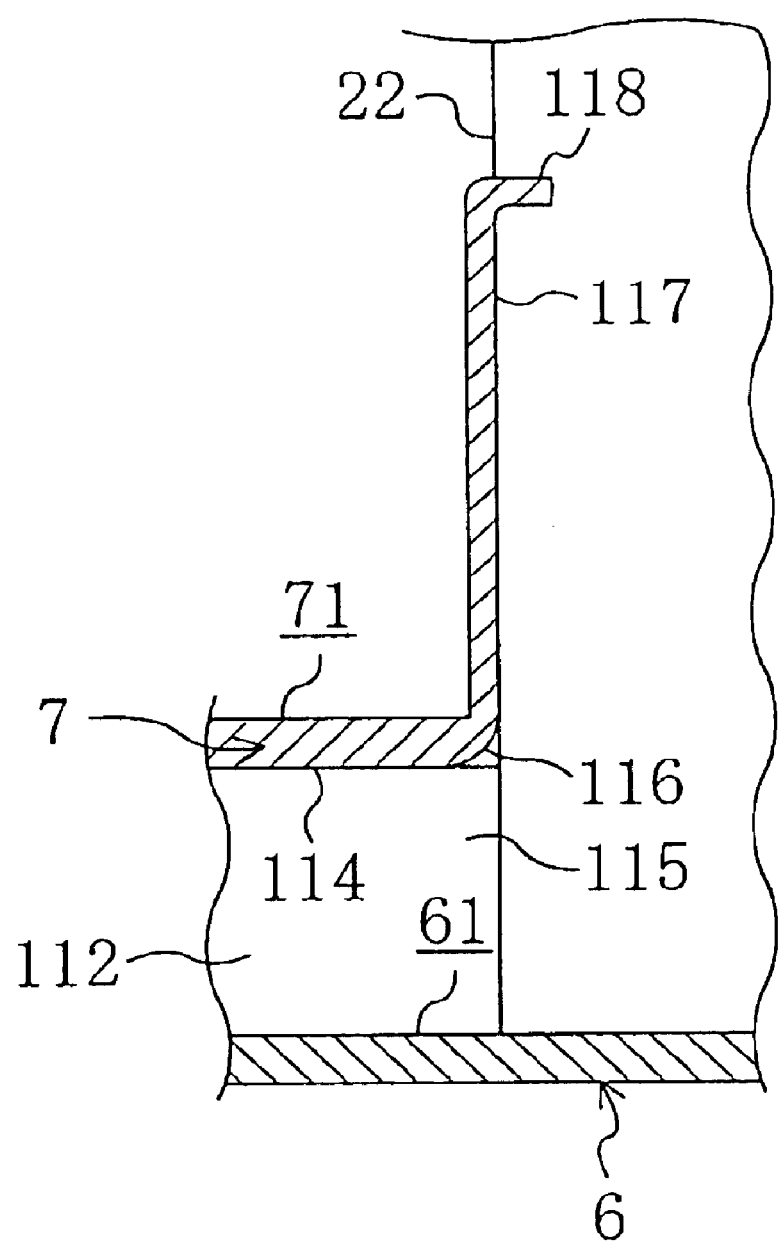
FIG. 9 is an illustrative cross-sectional view taken along line B—B in FIG. 7.

The posture shift guide 11 is formed in a rectangular cross section by the groove 111 of U-shaped cross section formed in the back face 72 of the guide plate 7 and the face plate 6 (see FIGS. 7 and 9). The width of the posture shift guide 11 is wide at its inlet 115, gradually becomes narrower from the inlet 115 forward, and is a little wider than the width of the welding nut N and narrower than the length of the diagonal line of the nut N. The inlet 115 is formed at its upper edge with a rounded portion 116 so that the groove depth at the inlet 115 is larger than the overall thickness T of the welding nut N. Furthermore, the inlet 115 is provided with a shift guide piece 117 standing from the front face 71 of the guide plate 7. The shift guide piece 117 is provided at its distal end with a folded part 118 vertical to its main part.

Figure 13:
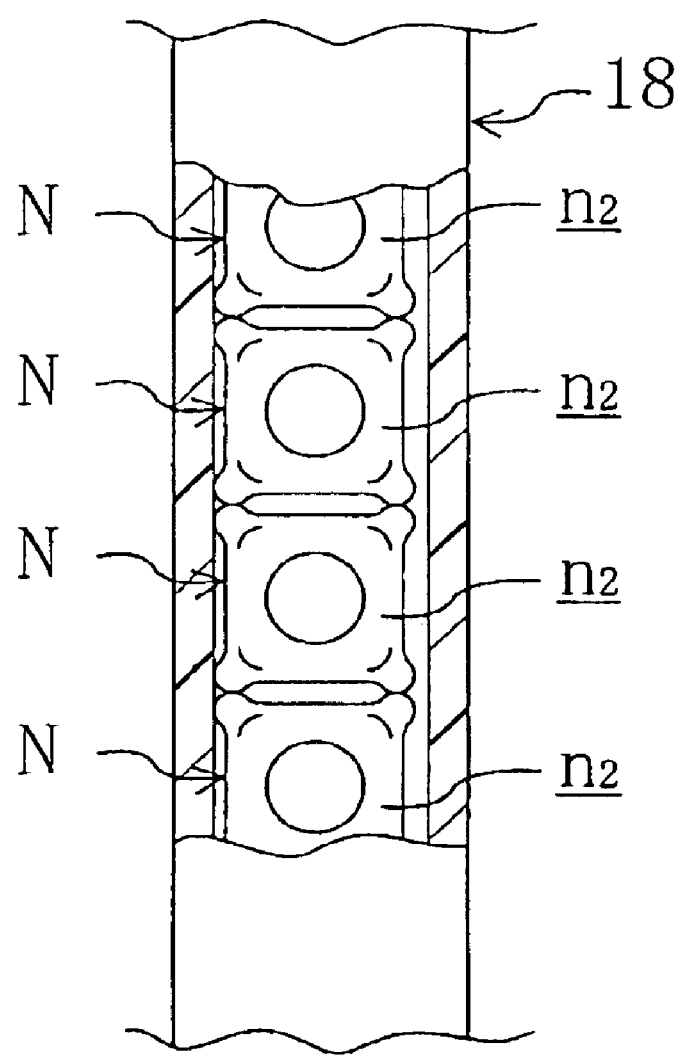
FIG. 13 is a partial cutaway view on an enlarged scale of an alignment and storage tube.

As shown in FIG. 7, the alignment and feed guide 14 is formed in a rectangular cross section by the U-shaped groove 141 formed in the back face 72 of the guide plate 7 and the face plate 6. While the inlet 145 of the guide plate 7 is adjacent to the sorting guide 13, the outlet 146 thereof is connected at the lower end of the guide plate 7 to a delivery tube 17 (see FIG. 1). This delivery tube 17 is connected to the proximal end of an alignment and storage tube 18 formed in a tube of rectangular cross section from a flexible synthetic resin, such as silicone resin, so that they communicate with each other. The distal end of the alignment and storage tube 18 is connected to the feeder 4 to feed welding nuts N stored therein (see FIG. 13) to the feeder 4.

Figure 10:
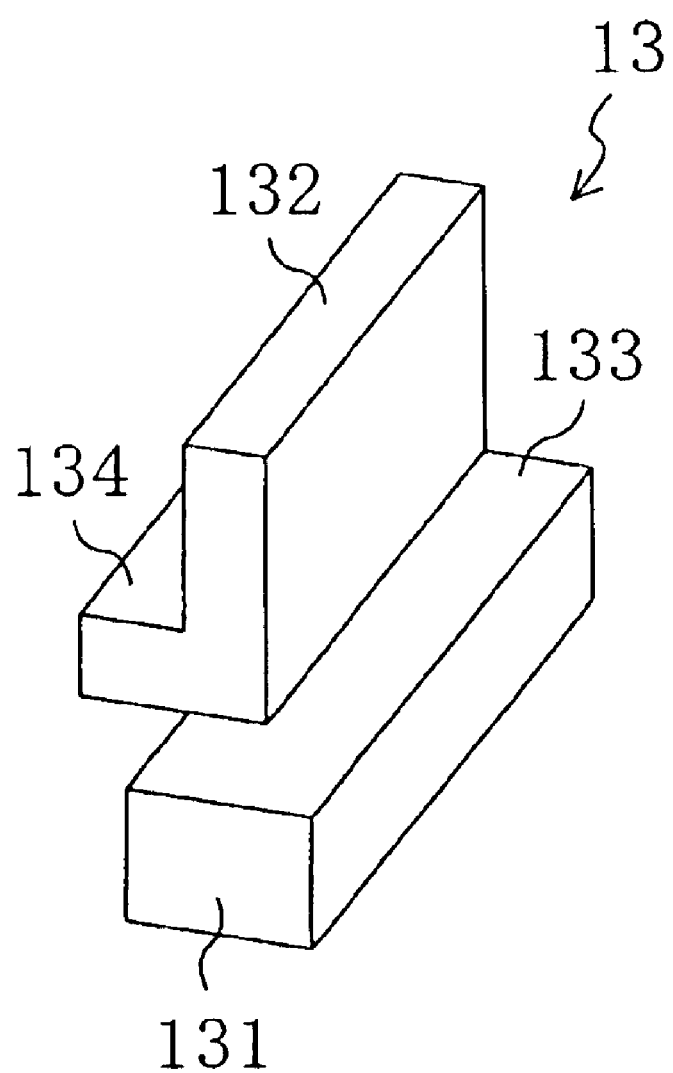
FIG. 10 is a perspective view of a thickness sorting guide.
Figure 20:
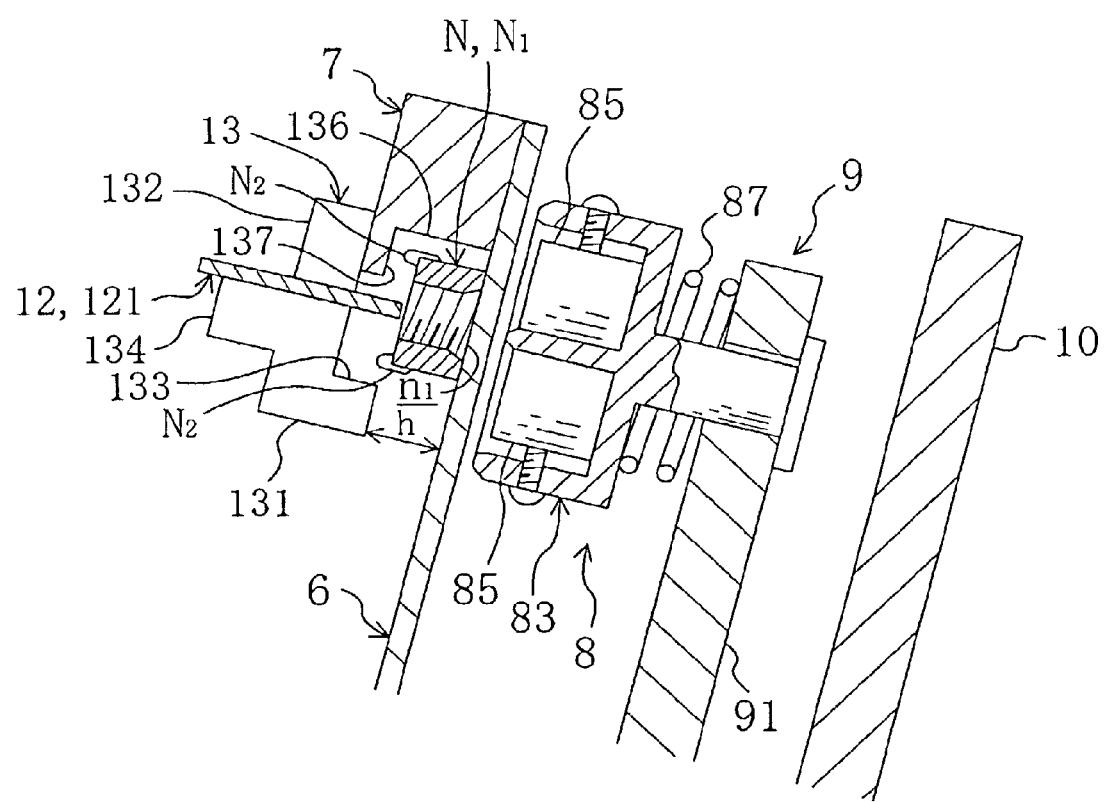
FIG. 20 is an illustrative cross-sectional view taken along line I—I in FIG. 12.

As shown in FIGS. 10 and 20, the thickness sorting guide 13 is formed of a guide piece 131 and a mounting piece 134, and a guide face 133 of the guide piece 131 and the mounting part 132 of the mounting piece 134 are disposed to form an L shape. As shown in FIGS. 7 and 20, the thickness sorting guide 13 extends generally horizontally on the upper end of the upper opening 732. The back end of the thickness sorting guide 13 abuts against the inlet 145 of the alignment and feed guide 14, while the inlet 135 thereof is separated from the outlet 119 of the posture shift guide 11.

The mounting part 132 is mounted to the front face 71 of the guide plate 7, thereby placing the guide piece 131 so as to be opposed to the face plate 6. The internal distance between the guide piece 131 and the face plate 6 is set to a dimension h smaller than the overall thickness T of the welding nut N. The internal distance between the guide face 133 of the guide piece 131 and the outer side wall 136 is set to a dimension corresponding to the length of one side of the welding nut N. The guide face 133 is continuous with the inner side wall 143 of the alignment and feed guide 14. In this case, the dimension h is the maximum value of the overall thicknesses of welding nuts to be sorted as irregular parts. In this way, a first path through which regular parts are guided is constituted by the guide piece 131 and the alignment and feed guide 14. On the other hand, a path extending from the thickness sorting guide 13 along the specific circumference P constitutes a second path through which irregular parts are guided. The mounting piece 134 for mounting the regulating piece 12 to this thickness sorting guide 13 extends out along the direction opposite to the direction along which the guide piece 131 extends out.

Figure 15:
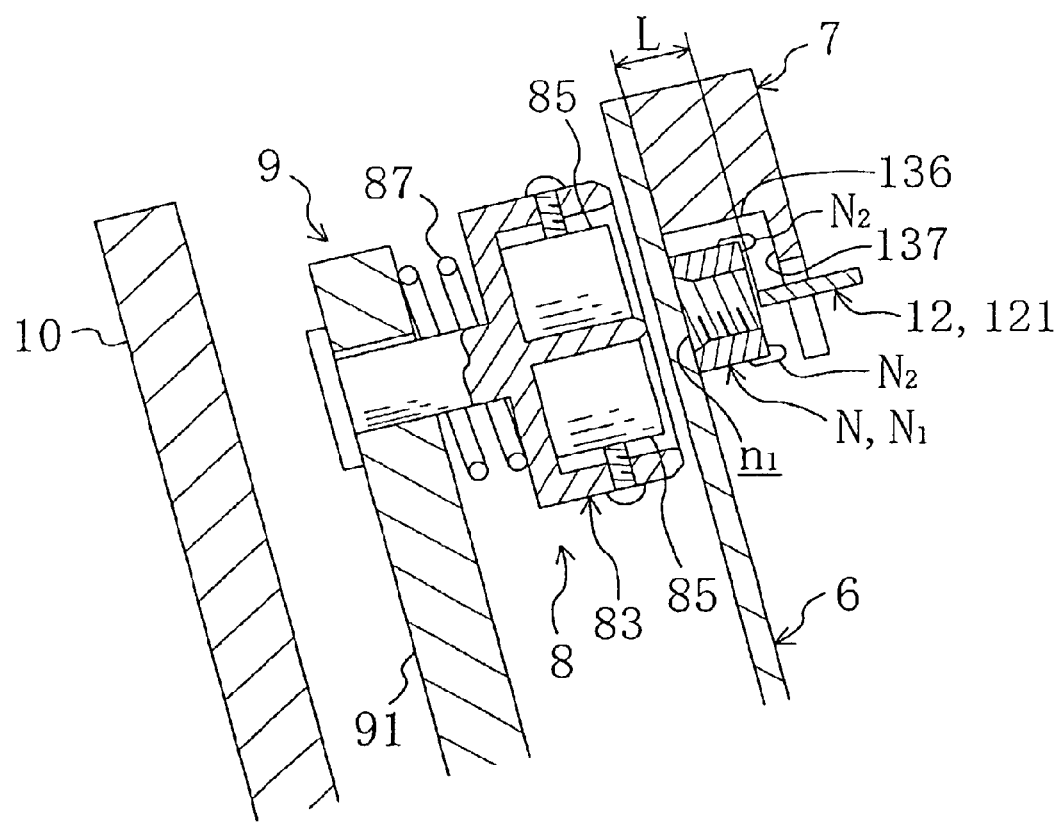
FIG. 15 is an illustrative cross-sectional view taken along line E—E in FIG. 12.

As shown in FIG. 7, the regulating piece 12 is so constructed that its proximal end is fixed to the mounting piece 134 of the thickness sorting guide 13 and its distal end projects closer to the outlet 119 of the posture shift guide 11 than the thickness sorting guide 13 and is located between the thickness sorting guide 13 and the outlet 119. As shown in FIG. 15, the internal distance between the projecting part 121 of the regulating piece 12 and the face plate 6 is set to a dimension L larger than the thickness t of the nut body $N_1$ of the welding nut N and smaller than the overall thickness T of the welding nut N. In addition, the projecting part 121 is disposed along the specific circumference P to pass substantially the middle position between both adjacent projections $N_2$ and $N_2$ of the welding nut N attracted by the attraction means 8 (see FIGS. 12 and 15). In this case, the dimension L is substantially the same as or less than the dimension h.

The parts removing part 15 will be described with reference to FIG. 8. The parts removing part 15 is constituted by, out of internal sides of the guide plate 7 defining the upper opening 732, an internal side 733 including the inlet 145 of the alignment and feed guide 14 located to the back of the thickness sorting guide 13. This internal side 733 extends diagonally downward from the outside of the specific circumference P, crosses the specific circumference P on its way and is then connected to the internal side of the semicircular lower opening 731.

Figure 11:
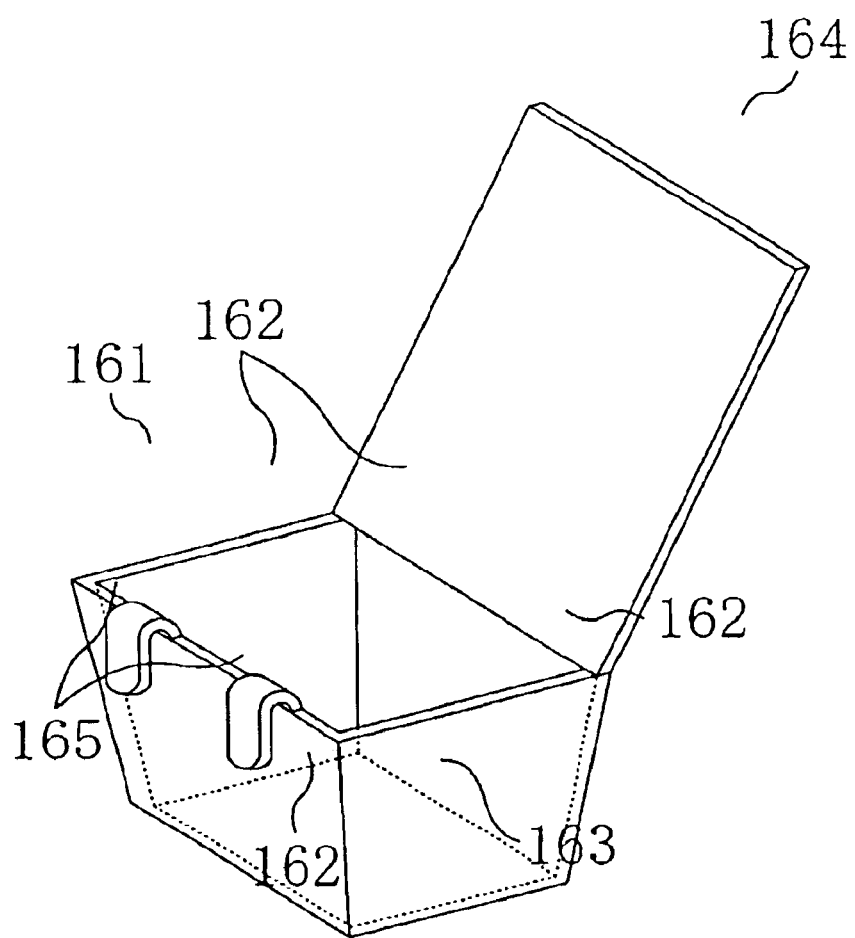
FIG. 11 is a perspective view of an irregular parts storage part.

As shown in FIG. 7, the irregular parts storage part 16 is placed in the opening 73 of the guide plate 7. As shown in FIG. 11, it comprises an open-top storage part 161 consisting of four sidewalls 162, 162, . . . and a bottom wall 163, a storage guide 164 provided on one of one opposed pair of the sidewalls 162, 162, . . . and one or more hooks 165 provided on the other sidewall 162 of the pair. The hooks 165 are removably caught onto the opening edge of the chute 22. This allows the irregular parts storage part 16 to be positioned above the nut reservoir 23 with the sidewall 162 opposed to the face plate 6 abutting against the front face 61 of the face plate 6 (see FIG. 2). Furthermore, the storage guide 164 extends diagonally upward from the upper end of the sidewall 162. The distal end of the storage guide 164 is positioned in the vicinity of the inlet of the thickness sorting guide 13 located to the back of the regulating piece 12, with the irregular parts storage part 16 caught onto the chute 22 (see FIG. 7).

A description will now be given of the principle of alignment of the welding nuts N according to the above embodiment. First, a large number of welding nuts N are charged from the hopper tube portion 21 through the chute portion 22 of the charging chute 2 and thereby stored in the nut reservoir 23. When the motor 92 is actuated in this state, the attraction means 8 move in the specific orbit R in accordance with the rotation of the corresponding arms 91 about the central axis X. In accordance with the movement of each attraction means 8, the magnetic field from both the permanent magnets 85 and 85, which acts on the front face 61 across the face plate 6, moves along the specific circumference P. Accordingly, the welding nuts N on the specific circumference P in the nut reservoir 23 are attracted and carried toward the inlet 115 of the posture shift guide 11 by the attraction means 8 while sliding on the face plate 6.

When the attracted welding nut N is in a lying posture in which either its top face $n_1$ or bottom face $n_2$ is opposed to the face plate 6, the welding nut N is corrected and shifted, by the outer side wall 112 and inner side wall 113, in a posture in which one side of the welding nut N is oriented along the outer side wall 111. On the other hand, when the attracted welding nut N is in a standing posture in which its side wall is opposed to the face plate 6, the welding nut N collides against the rounded portion 116 of the inlet 115 and is thereby laid down. Thus, the welding nut N is shifted into the aforementioned lying posture. Then, the welding nut N is corrected and shifted into the posture in which one side of the welding nut N is oriented along the outer side wall 112 in the same manner as described above. When the welding nut N in the standing posture is not laid down by the rounded portion 116, it is separated from the magnetic field of the attraction means in the inlet 115 to drop into the nut reservoir 23. In this case, since the inlet 115 is provided with the shift guide piece 117, the welding nut N is prevented from moving to the front face 71 of the guide plate 7. Since the folded part 118 is provided at the distal end of the shift guide piece 117, the welding nut N is certainly rejected.

Figure 14:
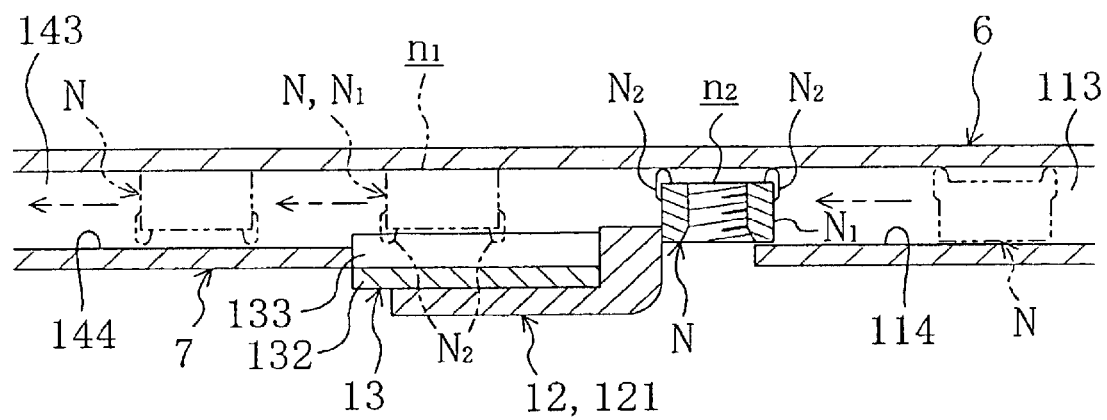
FIG. 14 is an illustrative cross-sectional view taken along line D—D in FIG. 12.
Figure 16:
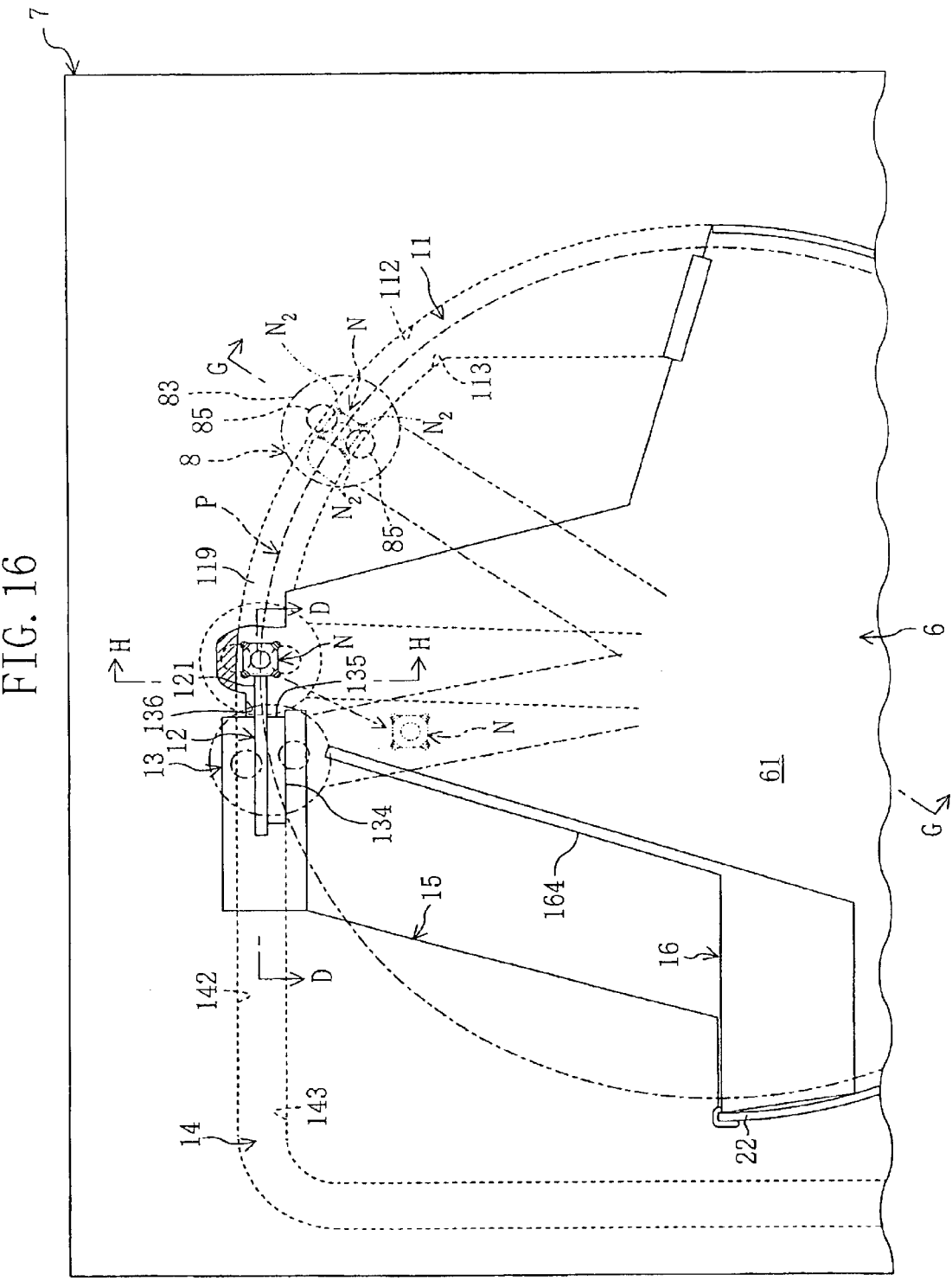
FIG. 16 is a partial cutaway view on an enlarged scale of FIG. 4, when the welding nut is in a lying posture in which its bottom face is opposed to a face plate 6.
Figure 17:
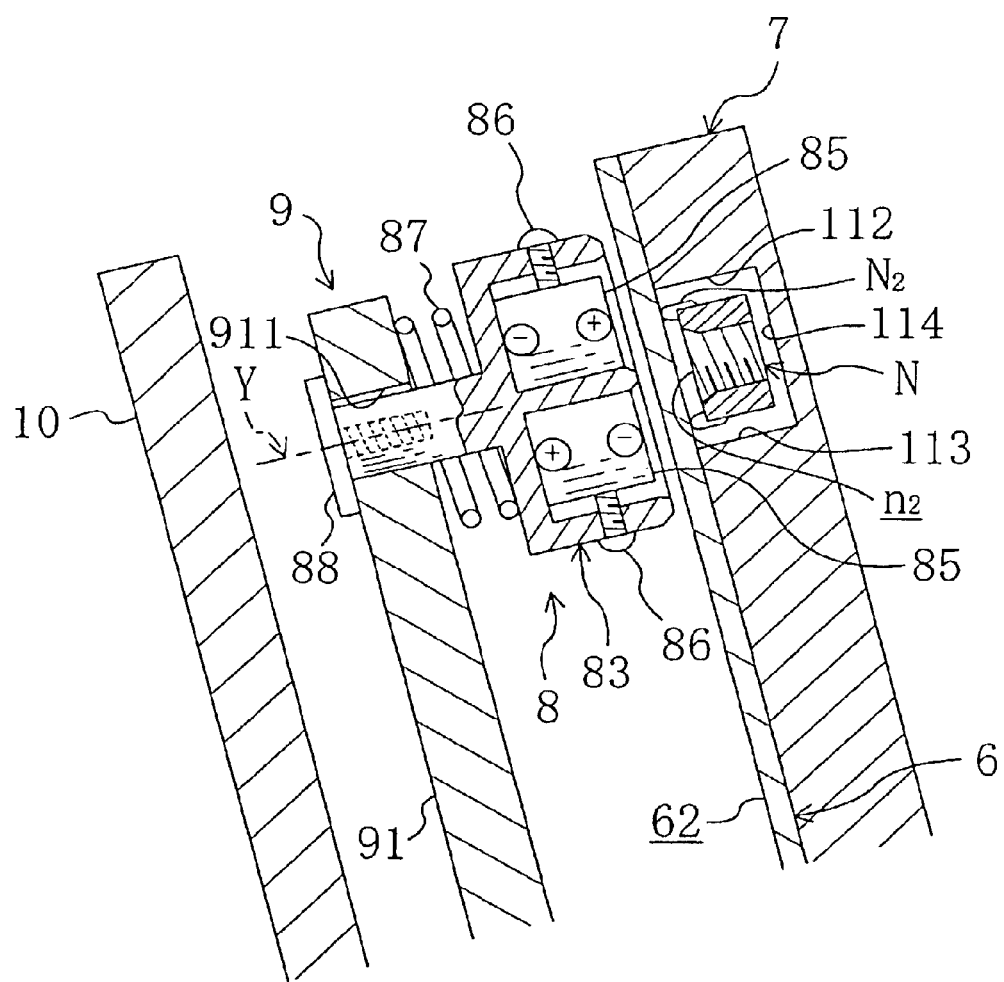
FIG. 17 is an illustrative cross-sectional view taken along line G—G in FIG. 16.
Figure 18:
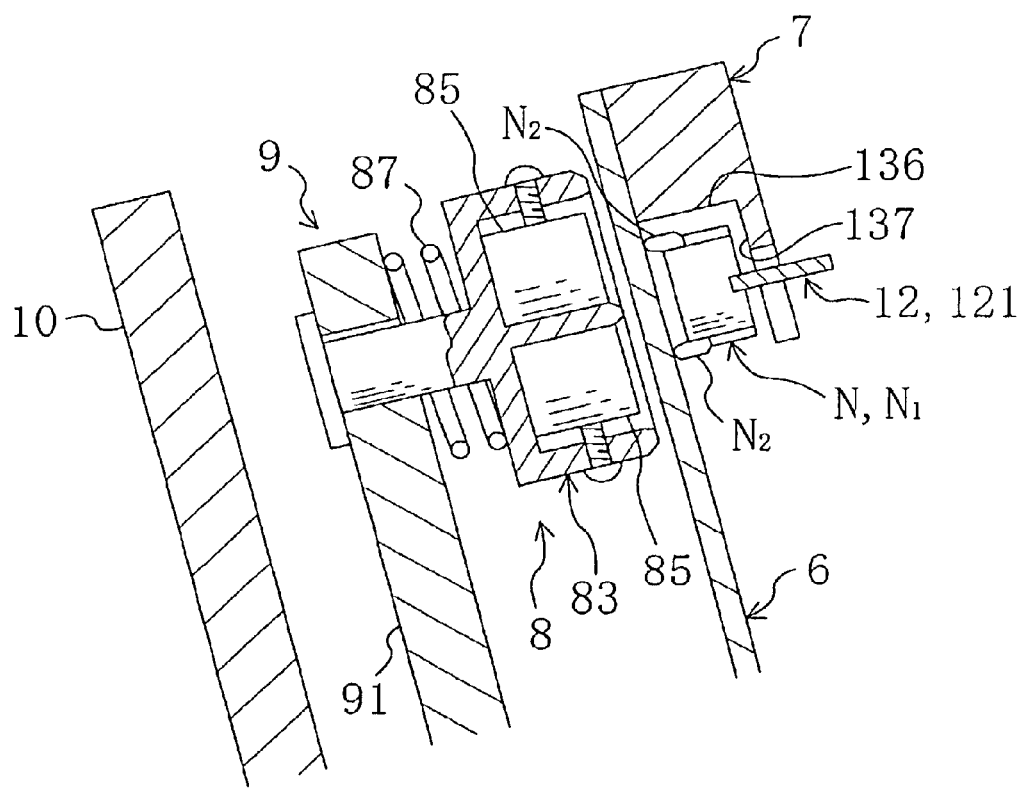
FIG. 18 is an illustrative cross-sectional view taken along line H—H in FIG. 16.

When the welding nut N shifted in posture is in a lying posture in which its bottom face $n_2$ is opposed to the face plate 6 as shown in FIGS. 16 and 17, it passes the inside of the posture shift guide 11 in accordance with the movement of the attraction means 8. Then, it leaves the outlet 119, and collides against the projecting part 121 of the regulating piece 12 as shown in FIGS. 14 and 18. This causes the welding nut N to get out of the force of attraction resulting from the magnetic field of the attraction means 8 and slide down on the face plate 6 toward the nut reservoir 23 located below (see FIG. 16). In this case, the welding nut N rejected by the regulating piece 12 is sometimes pulled, in the direction of orbital movement of the attraction means 8 by an influence of the magnetic field arising from the attraction means 8 to drop from the projecting part 121 not perpendicularly downward but diagonally downward to the forward side of the regulating piece 12 in the direction of orbital movement (lower-left direction in FIG. 16). However, the presence of the storage guide 164 of the irregular parts storage part 16 allows the welding nut N to drop into the nut reservoir 23 without dropping into the irregular parts storage part 16.

Figure 12:
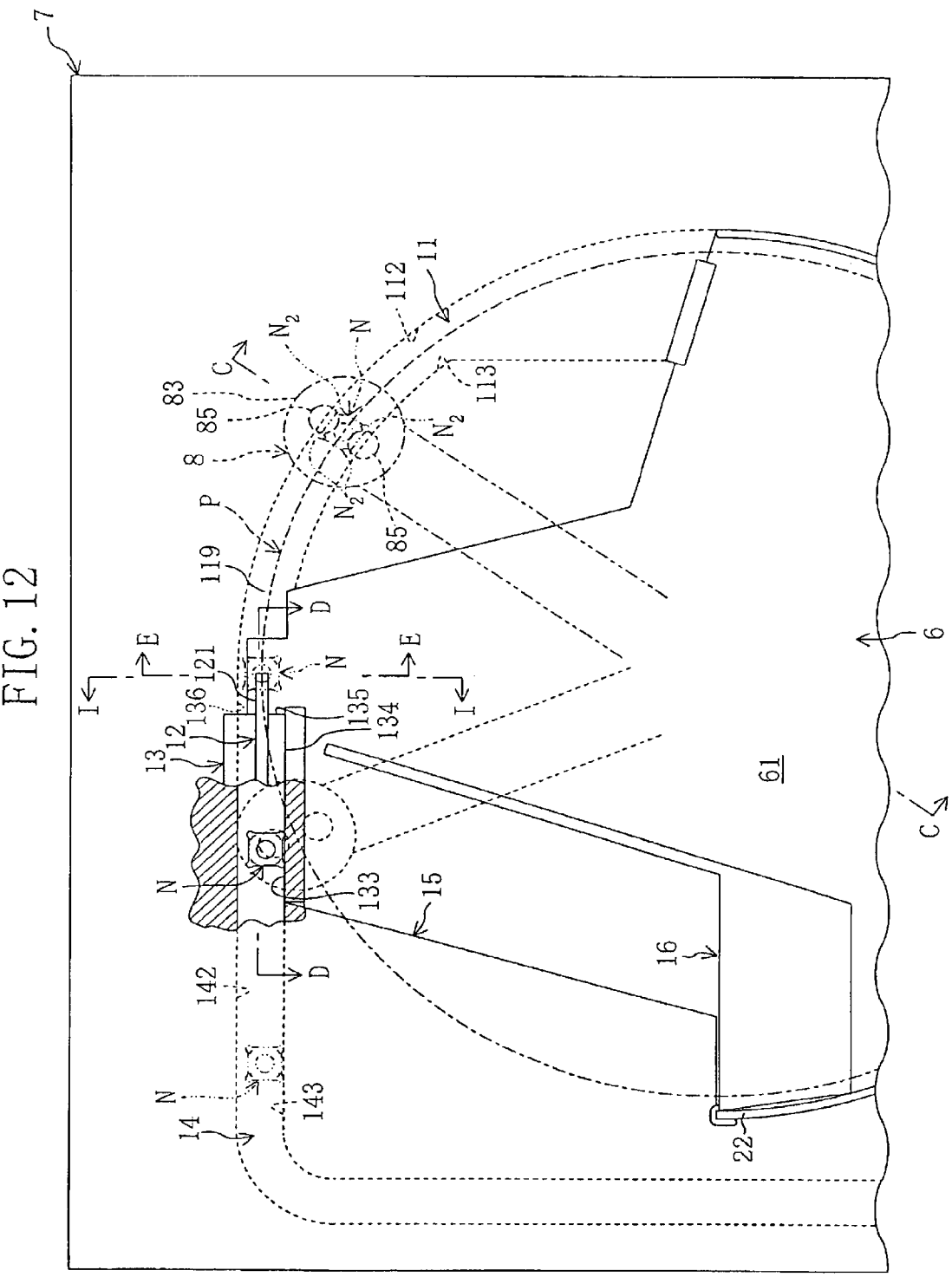
FIG. 12 is a partial cutaway view on an enlarged scale of FIG. 7, when the welding nut is in a lying posture in which its top face is opposed to a face plate 6.

Next, consideration is made of the case where the welding nut N shifted in posture by the posture shift guide 11 is in a lying posture in which its top face $n_1$ is opposed to the face plate 6 as shown in FIGS. 6 and 12. In this case, even if the welding nut N passes through the inside of the posture shift guide 11 in accordance with the movement of the attraction means 8, and leaves the outlet 119, as shown in FIGS. 14 and 15, it passes the space between the projecting part 121 of the regulating piece 12 and the face plate 6. As described so far, since the parts aligner of this embodiment slides the welding nut N on the face plate 6 by the attraction means 8 using the magnetic field, the sorting of welding nuts N depending on whether each is face-up or face-down can be conducted with higher accuracy without any vibration of the welding nuts N in the direction perpendicular to the face plate 6, unlike a parts aligner in which parts are aligned by vibration or the like.

Figure 19A:
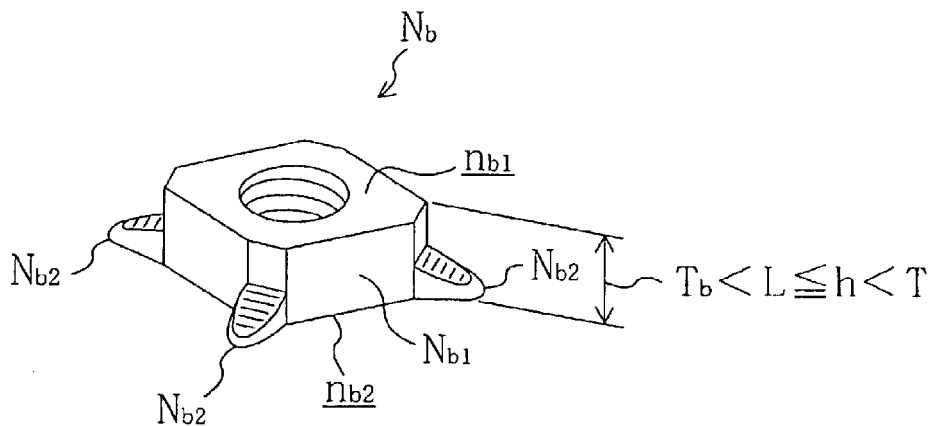
FIG. 19 is a perspective view of an irregular welding nut.
Figure 19B:
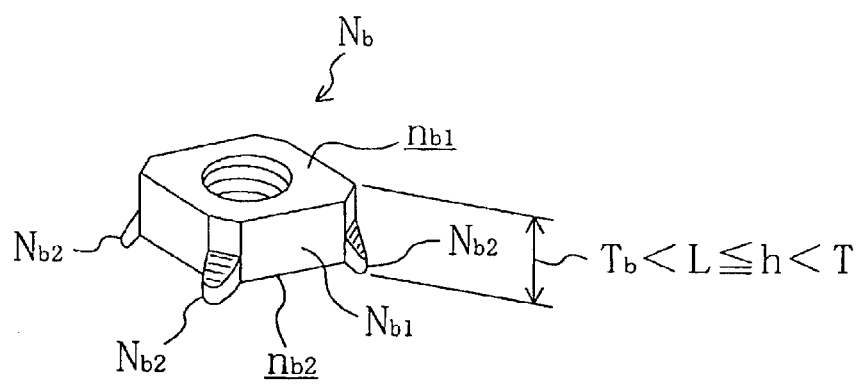
Figure 19C:
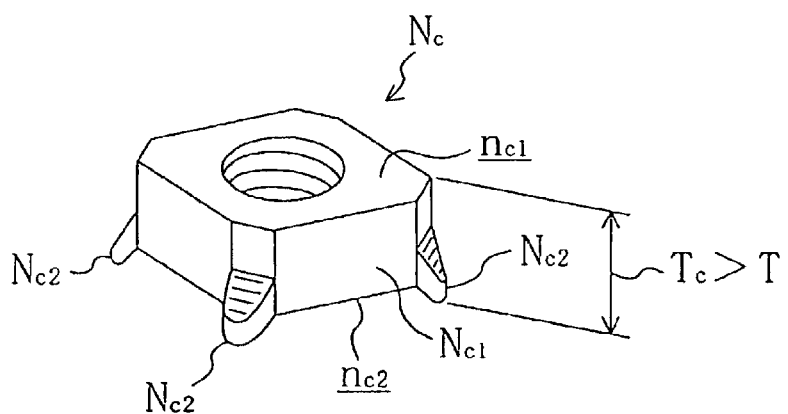
Figure 21A:
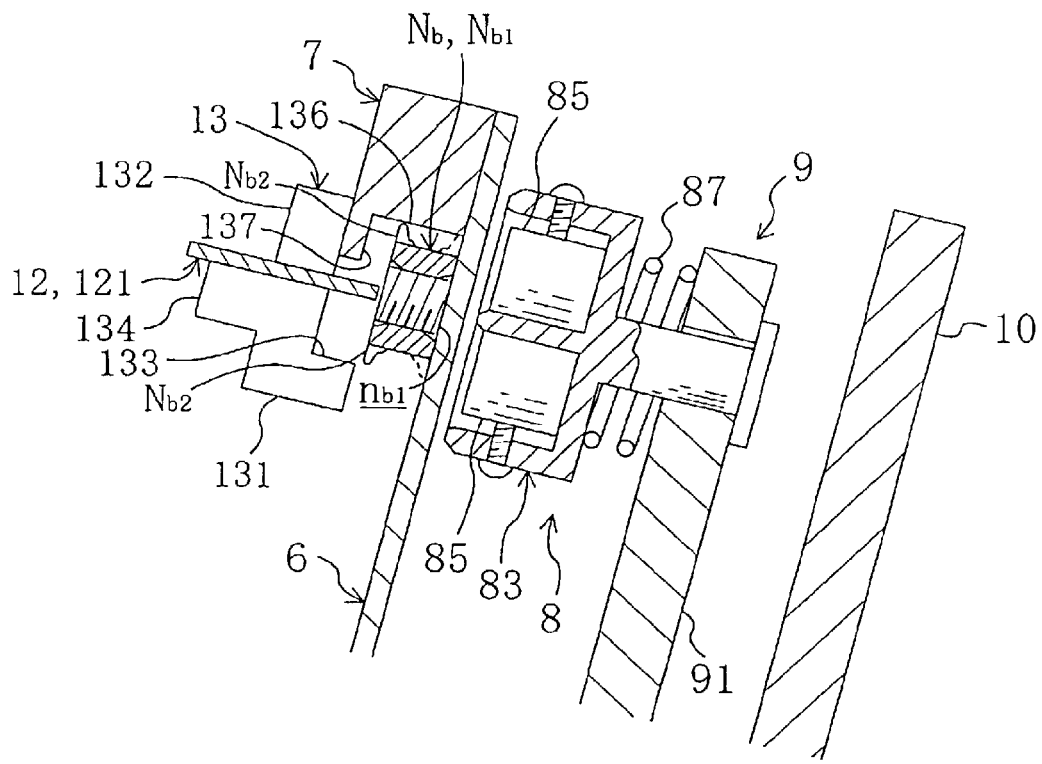
FIG. 21 is an illustrative cross-sectional view taken along line J—J in FIG. 22.
Figure 21B:
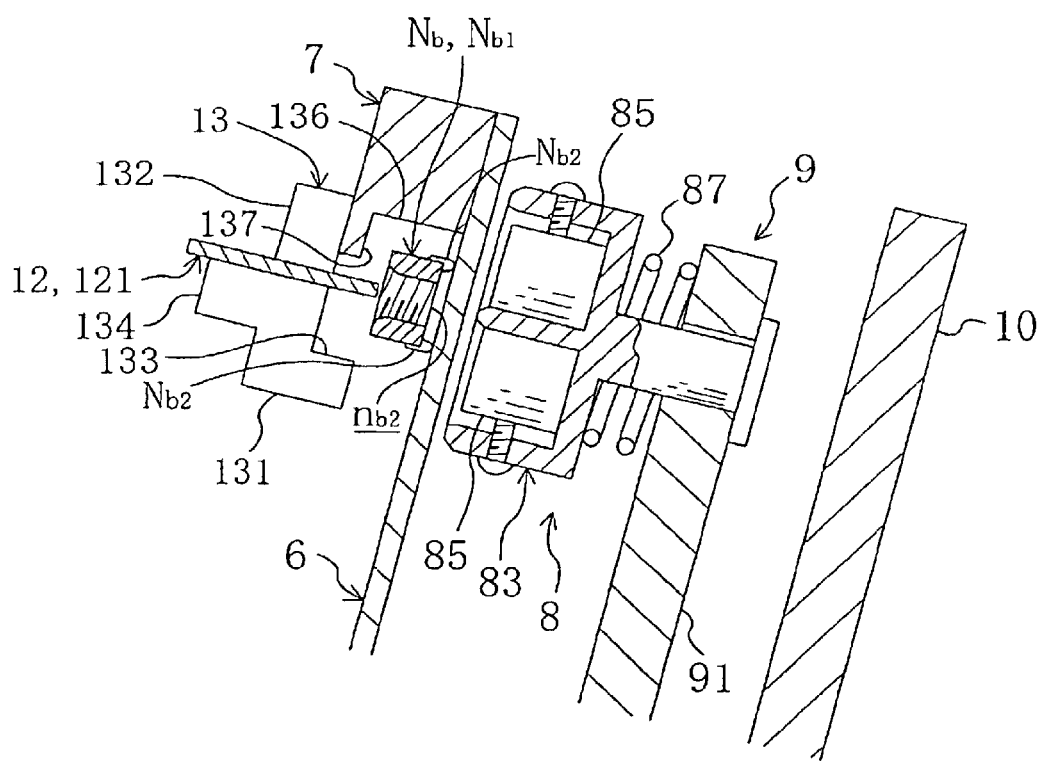

However, in some cases, welding nuts N charged into the nut reservoir 23 include not only regular welding nuts $N_a$ of specific shape and dimension (see FIG. 3) but also irregular welding nuts $N_b$, such as irregular welding nuts whose projecting portions $N_{b2}$ are crushed (see FIG. 19A) and irregular welding nuts that are totally small in dimension (see FIG. 19B), and irregular welding nuts $N_c$ that are totally large in dimension (see FIG. 19C). When the overall thickness $T_b$ of the irregular welding nut $N_b$ is smaller than the dimension L of the space between the projecting part 121 of the regulating piece 12 and the face plate 6, the irregular welding nut $N_b$ is shifted into a lying posture by the posture shift guide 11. Then, the irregular welding nut $N_b$ passes through the space between the projecting part 121 and the face plate 6 independently of whether the face thereof opposed to the face plate 6 is its top face $n_{b1}$ or bottom face $n_{b2}$ (see FIGS. 21A and 21B). Without any special measures, the irregular welding nuts $N_b$ would be accidentally mixed into the alignment and storage tube 18 which should store the regular welding nuts $N_a$ each assuming a lying posture in which the top face $n_{a1}$ is opposed to the face plate 6.

This problem is solved by providing the thickness sorting guide 13. More particularly, when a welding nut N sorted by the regulating piece 12 is a regular welding nut $N_a$, as shown in FIGS. 12 and 20, the regular welding nut $N_a$ tends to move on the specific circumference P in accordance with the orbital movement of the attraction means 8. However, the regular welding nut $N_a$ moves on the guide face 133 of the thickness sorting guide 13 extending tangentially from the inlet 135, moves through the thickness sorting guide 13, while gradually getting out of the force of attraction resulting from the magnetic field of the attraction means 8, and then enters the alignment and feed guide 14. Then, it moves through the alignment and feed guide 14 by its inertia, or is pushed by the next regular welding nut $N_a$ guided to the alignment and feed guide 14 through the continuous orbital movement of the attraction means 8. Finally, the regular welding nut $N_a$ is stored in its aligned position in the alignment and storage tube 18.

Figure 22:
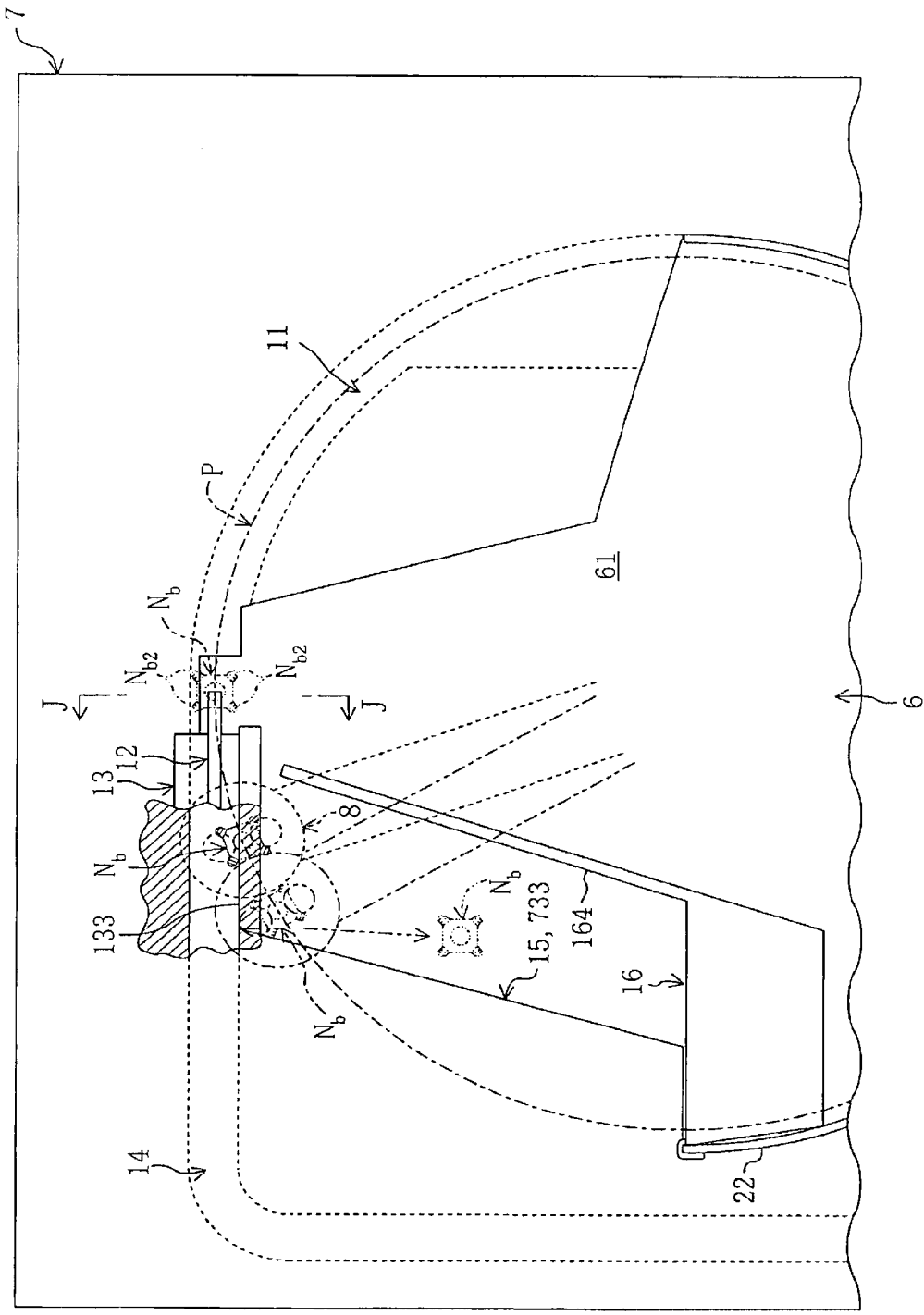
FIG. 22 is a partial cutaway view on an enlarged scale of FIG. 7, showing the state where the irregular welding nut is fed to an irregular parts storage part.

On the other hand, when a welding nut N passing through the regulating piece 12 is an irregular welding nut $N_b$, as shown in FIGS. 21 and 22, the irregular welding nut $N_b$ is prevented from moving on the guide face 133 of the thickness sorting guide 13, but moves on the specific circumference P between the thickness sorting guide 13 and the face plate 6 in accordance with the orbital movement of the attraction means 8 while being attracted by the attraction means 8. As a result, the irregular welding nut $N_b$ does not enter the inside of the alignment and feed guide 14, and therefore is not stored in the alignment and storage tube 18. As seen from the above, since the parts aligner of this embodiment slides the welding nut N on the face plate 6 by the attraction means 8 using the magnetic field, the sorting of the welding nuts N by thickness can be conducted with higher accuracy without any vibration of the welding nuts N in the direction perpendicular to the face plate 6, unlike the parts aligner in which parts are aligned by vibration or the like.

The irregular welding nut $N_b$ as attracted by the attraction means 8 continues its orbital movement in accordance with the orbital movement of the attraction means 8 to reach the parts removing part 15 placed on the specific circumference P. The internal side 733 of the guide plate 7 serving as the parts removing part 15 is placed to extend from the outside of the specific circumference P to the inside thereof across it. Therefore, the irregular welding nut $N_b$ collides against the internal side 733, gets out of the magnetic field of the attraction means 8, and slides down on the face plate 6.

Thereafter, the irregular welding nut $N_b$ having slid down on the face plate 6 is stored in the irregular parts storage part 16 located below the internal side 733. Therefore, it does not again return to the nut reservoir 23.

In addition, the dimensions of welding nuts that can pass through the posture shift guide are regulated by the internal distance between the outer side wall 112 and the inner side wall 113 of the posture shift guide 11 and the internal distance between the bottom wall 114 of the posture shift guide 11 and the face plate 6. The irregular welding nuts $N_c$ having totally large dimensions are rejected by the inlet 115 of the posture shift guide 11, thereby dropping into the nut reservoir 23.

It is to be understood that the present invention is not intended to be limited to the above embodiment, and covers other various embodiments. More particularly, the above embodiment shows the case where the parts to be aligned are welding nuts in the form of substantially square as viewed from the top thereof, but the present invention is not limited thereto. The present invention can also be adapted for the case where the parts to be aligned are welding nuts in the form of circle or hexagon as viewed from the top thereof and having, on their corners, projections to be molten on welding. Applicable parts for the present invention are not limited to welding nuts. The present invention can be adapted for aligning any parts as long as they change their shape, especially thickness, between the condition where the top face is opposed to the face plate 6 and the condition where the bottom face is opposed to the face plate 6.

The above embodiment shows the case where the face plate 6 is disposed in a tilted position, but the present invention is not limited thereto. Since parts are attracted by the magnetic field arising from the attraction means 8, the face plate 6 may be disposed vertically.

In the above embodiment, the regulating piece 12 and the thickness sorting guide 13 are located in the vicinity of the uppermost part of the specific circumference P. However, as long as the regulating piece 12 and the thickness sorting guide 13 are located on the specific circumference P and between the posture shift guide 11 and the irregular parts storage means, the present invention can be adapted to sort the parts by orientation and thickness.

Furthermore, in the above embodiment, the thickness sorting guide 13 and the alignment and feed guide 14 extend tangentially from the vicinity of the uppermost part of the specific circumference P while brought into abutment against each other. However, as long as the thickness sorting guide 13 and the alignment and feed guide 14 extend from one point on the specific circumference P in the direction away from the specific circumference P while brought into abutment against each other, the present invention can be adapted to separate the regular parts from the attraction means 8 and guide them to the alignment and storage tube 18.

The above embodiment shows the case where the guide plate 7 is provided to place the posture shift guide 11, the alignment and feed guide 14 and the parts removing part 15 on the face plate 6, but the present invention is not limited thereto. A U-shaped guide, a flat plate serving as a removing part or the like may be placed directly on the face plate 6 by welding or otherwise.

Moreover, in the above embodiment, the parts removing part 15 and the irregular parts storage part 16 are provided as irregular pairs storage means. However, only the irregular parts storage part 16 may be provided without providing the parts removing part 15. In this case, only the irregular parts storage part 16 will serve as an irregular parts storage means. More particularly, in FIG. 22, the absence of the parts removing part 15 allows the irregular welding nut $N_b$ guided to the second path to reach the irregular parts storage part 16 while being attracted by the attraction means 8. Then, the irregular welding nut $N_b$ collides against the bottom wall 163, and is thereby released from the attraction of the attraction means 8 against the magnetic force thereof. As a result, the irregular welding nut $N_b$ is stored in the irregular parts storage part 16.

What is claimed is:

1. A parts aligner for sorting parts depending on whether each is face-up or face-down and thereby shifting the parts into a unified posture, said parts aligner comprising:

a face plate;

attraction means placed on either one side of said face plate, said attraction means being configured to attract the parts on the other side of the face plate through the face plate and orbitally move in a specific orbit;

a posture shift guide for shifting a part attracted by the attraction means and moving on a specific circumference corresponding to the specific orbit into a posture in which the top face or bottom face of the part is directed to the other side of the face plate;

a top-bottom sorting means for permitting the passage of, out of parts shifted in posture and attracted and moved by the attraction means, parts each with its top face directed to the other side of said face plate, while rejecting the passage of parts each with its bottom face directed to the other side of said face plate; and a regular parts sorting means for guiding, out of parts passing through said top-bottom sorting means and attracted and moved by the attraction means, parts of regular shape to a first path, while guiding parts of irregular shape to a second path different from the first path.

2. The parts aligner of claim 1, wherein said face plate is flat and disposed in a tilted position with the other side thereof facing diagonally upward, said top-bottom sorting means and said regular parts sorting means are disposed in an upper position of the other side of said face plate, said parts aligner further comprises a parts reservoir capable of storing a plurality of parts in their non-aligned positions, said parts reservoir being disposed in the vicinity of the lower end of the other side of said face plate, and said attraction means is configured to attract the parts in said parts reservoir and move the attracted parts.

3. The parts aligner of claim 1, further comprising:

an alignment and storage part for storing parts of regular shape guided to said first path in an aligned position; and an irregular parts storing means for storing parts of irregular shape guided to said second path.

4. The parts aligner of claim 1, wherein said parts are welding nuts each comprising: a nut body of a prescribed thickness having its top face and bottom face in parallel with each other and both in the form of substantially square; and projections extending from the respective corners of said nut body on the bottom face side, said top-bottom sorting means is composed of a regulating piece having a narrower width than the distance between the adjacent projections of the welding nut, and said regulating piece is positioned generally in the middle of a path through which the welding nut is attracted and moved by said attraction means and is disposed to form, between the regulating piece and the face plate, a space which is larger than the thickness of said nut body and smaller than the overall thickness of the welding nut including said nut body and said projections.

5. The parts aligner of claim 1, wherein said first path is placed outside the specific circumference, while said second path extends along said specific circumference, and said regular parts sorting means sorts the parts into those of regular shape and those of irregular shape on the basis of the maximum thickness, releases the parts of regular shape from the attraction of said attraction means to guide them to the first path, and permits the parts of irregular shape to move to the second path while being attracted by said attraction means.

* * * * *